(12) United States Patent
Goto et al.

(10) Patent No.: US 10,745,077 B2
(45) Date of Patent: Aug. 18, 2020

(54) BICYCLE CONTROL DEVICE

(71) Applicant: Shimano Inc., Sakai-shi, Osaka (JP)

(72) Inventors: Yasunobu Goto, Sakai (JP); Tatsuya Matsushita, Sakai (JP); Noriko Masuta, Sakai (JP)

(73) Assignee: Shimano Inc., Sakai-shi, Osaka (JP)

( * ) Notice: Subject to any disclaimer, the term of this patent is extended or adjusted under 35 U.S.C. 154(b) by 0 days.

(21) Appl. No.: 15/717,669

(22) Filed: Sep. 27, 2017

(65) Prior Publication Data

US 2019/0092420 A1 Mar. 28, 2019

(51) Int. Cl.
*B62K 23/06* (2006.01)
*B62M 25/04* (2006.01)
*B62L 3/02* (2006.01)

(52) U.S. Cl.
CPC .............. *B62K 23/06* (2013.01); *B62L 3/02* (2013.01); *B62M 25/04* (2013.01)

(58) Field of Classification Search
CPC .......... B62K 23/06; B62L 3/02; B62L 3/023; B62M 25/04; B62M 25/02; B62M 2701/0053
USPC ............................. 74/473.12, 473.3, 473.14
See application file for complete search history.

(56) References Cited

U.S. PATENT DOCUMENTS

| | | | | |
|---|---|---|---|---|
| 3,977,270 A * | 8/1976 | Cristie | ...................... | B62L 3/02 74/480 R |
| 8,746,106 B2 * | 6/2014 | Miki | ...................... | B62M 25/04 74/486 |
| 8,931,365 B2 * | 1/2015 | Fujii | ...................... | B62M 25/08 74/491 |
| 9,090,303 B2 * | 7/2015 | Fukao | ...................... | B62L 3/02 |
| 9,120,522 B1 | 9/2015 | Nishino | | |
| 9,469,380 B2 * | 10/2016 | Watarai | .................. | B62M 25/04 |
| 2015/0284049 A1 * | 10/2015 | Shipman | ................ | B62M 25/08 74/473.12 |
| 2016/0272282 A1 * | 9/2016 | Tsai | ........................ | B62M 25/08 |

FOREIGN PATENT DOCUMENTS

| | | |
|---|---|---|
| CN | 103895803 A | 7/2014 |
| CN | 205554504 U | 9/2016 |
| CN | 105984555 A | 10/2016 |
| TW | 201544375 A | 12/2015 |

OTHER PUBLICATIONS

How to Change Road-Style Bicycle Brake Levers, drum15243, Mar. 19, 2012, instructables.com (Year: 2012).*

* cited by examiner

*Primary Examiner* — Bobby Rushing, Jr.
(74) *Attorney, Agent, or Firm* — Alleman Hall Creasman & Tuttle LLP

(57) ABSTRACT

A bicycle control device comprises a bracket member including a first end portion and a second end portion with a saddle portion provided in between the first end portion and the second end portion for gripping. The second end portion has a pair of spaced apart walls with opposed surfaces. The control device further comprises a lever pivotally provided around a pivot axis extending between the opposed surfaces. The lever includes a protruding portion extending in an axial direction of the pivot axis to an outermost point that is at least 23.2 mm offset from a reference plane parallel to a bicycle center plane and defined at a midpoint between the opposed surfaces, as viewed from a parallel direction parallel to the reference plane.

19 Claims, 8 Drawing Sheets

BICYCLE CONTROL DEVICE

BACKGROUND

In recent years, some bicycles have been provided with control devices mounted on a handlebar. The control devices include one or more levers that can be manipulated to control the bicycle by, for example, braking or changing gears of the bicycle. In order to operate one such control device, the rider sometimes rests their palm on the control device and manipulates the lever(s) with their fingers.

SUMMARY

A bicycle control device developed to address the above identified issues is disclosed herein. In accordance with a first aspect of the present invention, the bicycle control device comprises a bracket member including a first end portion and a second end portion with a saddle portion provided in between the first end portion and the second end portion for gripping. The second end portion has a pair of spaced apart walls with opposed surfaces. The bicycle control device comprises a lever pivotally provided around a pivot axis extending between the opposed surfaces. The lever includes a protruding portion extending in an axial direction of the pivot axis to an outermost point that is at least 23.2 mm offset from a reference plane parallel to a bicycle center plane and defined at a midpoint between the opposed surfaces, as viewed from a parallel direction parallel to the reference plane.

With the bicycle control device according to the first aspect, it is possible to enable riders with small hands to easily reach the lever by touching the protruding portion.

In accordance with a second aspect of the present invention, a bicycle control device comprises a bracket member including a first end portion and a second end portion with a saddle portion provided in between the first end portion and the second end portion for gripping. The second end portion has a pair of spaced apart walls with opposed surfaces. The bicycle control device comprises a lever pivotally provided around a pivot axis extending between the opposed surfaces. The lever includes a protruding portion extending in an axial direction of the pivot axis to an outermost point that is offset from a reference plane parallel to a bicycle center plane and defined at a midpoint between the opposed surfaces. As viewed from the axial direction, in a parallel plane parallel to the reference plane and containing the outermost point, a shortest distance of a first line connecting a saddle point of the saddle portion to the outermost point on the lever, is in a range from 50 to 80 mm.

With the bicycle control device according to the second aspect, it is possible to form the protruding point at a distance within reach of fingers of the small hand when the palm of the hand is placed on the saddle point and enable riders with small hands to easily reach the lever by touching the protruding portion.

In accordance with a third aspect of the present invention, a bicycle control device comprises a bracket member including a first end portion and a second end portion with a saddle portion provided in between the first end portion and the second end portion for gripping. The second end portion has a pair of spaced apart walls with opposed surfaces. The bicycle control device comprises a lever pivotally provided around a pivot axis extending between the opposed surfaces. The lever includes a proximal end portion at least partly arranged between the opposed surfaces, a distal end portion further from the opposed surfaces than the proximal end portion, and a protruding portion extending in an axial direction of the pivot axis to an outermost point. The protruding portion is arranged between the proximal end portion and the distal end portion.

With the bicycle control device according to the third aspect, it is possible to form the protruding point at a location along the lever that is within reach of the fingers of the small hand when the palm of the hand is placed on the saddle portion.

In accordance with a fourth aspect of the present invention, the bicycle control device according to the third aspect is configured so that the distal end portion has a distal end opposite the proximal end portion, and a shortest distance between the outermost point and the distal end is at least 50 mm, as viewed from a parallel direction parallel to a reference plane parallel to a bicycle center plane and defined at a midpoint between the opposed surfaces.

With the bicycle control device according to the fourth aspect, it is possible to form the protruding point at a location along the lever that is within reach of the fingers of the small hand when the palm of the hand is placed on the saddle portion.

In accordance with a fifth aspect of the present invention, the bicycle control device according to the any one of the first through fourth aspects is configured so that the outermost point is at most 50 mm offset from the reference plane.

With the bicycle control device according to the fifth aspect, it is possible to avoid excessively widening the rider's grip in an uncomfortable and awkward manner.

In accordance with a sixth aspect of the present invention, the bicycle control device according to any one of the first through fifth aspects is configured so that, as viewed from the axial direction, in a parallel plane parallel to the reference plane and containing the outermost point, a shortest distance of a first line connecting a saddle point of the saddle portion to the outermost point on the lever, is in a range from 50 to 80 mm.

With the bicycle control device according to the sixth aspect, it is possible to form the protruding point at a distance within reach of fingers of the small hand when the palm of the hand is placed on the saddle point.

In accordance with a seventh aspect of the present invention, the bicycle control device according to the sixth aspect is configured so that, as viewed from the axial direction, in the parallel plane, an angle of the first line is between about 10 and 30 degrees from a second line connecting the outermost point to the pivot axis.

With the bicycle control device according to the seventh aspect, it is possible to make it easier for the rider with small hands to operate the lever around the pivot axis by placing their fingers on the protruding portion.

In accordance with an eighth aspect of the present invention, the bicycle control device according to any one of the first through seventh aspects is configured so that the lever includes a proximal end portion and a distal end portion, and an offset part formed in the distal end portion so as to be offset from the protruding portion toward the reference plane.

With the bicycle control device according to the eighth aspect, a rider can easily operate the lever when gripping downwardly curved portions of a drop handlebar.

In accordance with a ninth aspect of the present invention, the bicycle control device according to any one of the first through eighth aspects is configured so that the lever includes a recess.

With the bicycle control device according to the ninth aspect, less material is used in the lever, reducing material cost and a weight of the lever.

In accordance with a tenth aspect of the present invention, the bicycle control device according to any one of the first through ninth aspects is configured so that the lever is manufactured of one of a metal, composite, and plastic material.

With the bicycle control device according to the tenth aspect, it is possible to manufacture the lever from a suitable material according to the desired properties.

In accordance with an eleventh aspect of the present invention, the bicycle control device according to any one of the first through tenth aspects further comprises an interchangeable lever, interchangeably attachable to the bracket member with the lever.

With the bicycle control device according to the eleventh aspect, it is possible to accommodate a variety of hand sizes with the same control device.

In accordance with a twelfth aspect of the present invention, the bicycle control device according to the eleventh aspect is configured so that respective proximal end portions of the lever and the interchangeable lever have the same shape.

With the bicycle control device according to the twelfth aspect, it is possible to fit the proximal end of either lever into the bracket member.

In accordance with a thirteenth aspect of the present invention, the bicycle control device according to either one of the eleventh and twelfth aspects is configured so that respective distal end portions of the lever and the interchangeable lever have the same shape.

With the bicycle control device according to the thirteenth aspect, it is possible for the rider to operate the respective distal ends with familiarity, and for the distal ends to fit in relation to the handlebar while the control device is mounted at the same position.

In accordance with a fourteenth aspect of the present invention, the bicycle control device according to any one of the first through thirteenth aspects is configured so that the lever includes a finger-engaging surface, at least a portion of which is a planar portion.

With the bicycle control device according to the fourteenth aspect, it is possible to securely operate the lever while the rider looks ahead.

In accordance with a fifteenth aspect of the present invention, the bicycle control device according to the fourteenth aspect is configured so that the planar portion of the finger-engaging surface is positioned entirely to one side of the reference plane.

With the bicycle control device according to the fifteenth aspect, it is possible to easily operate the lever using the planar portion when gripping the downwardly curved portions of the drop handlebar.

In accordance with a sixteenth aspect of the present invention, the bicycle control device according to any one of the first through fifteenth aspects is configured so that the lever is configured to pivot around the pivot axis to actuate a first control, and the lever is configured to pivot around an additional axis skew to the pivot axis to actuate a second control.

With the bicycle control device according to the sixteenth aspect, it is possible to provide multiple control functions to the control device.

In accordance with a seventeenth aspect of the present invention, the bicycle control device according to the sixteenth aspect is configured so that the first control is a brake and the second control is a gear shift.

With the bicycle control device according to the seventeenth aspect, it is possible to enable the rider to brake the bicycle or shift gears with the same control device.

In accordance with an eighteenth aspect of the present invention, the bicycle control device according to any one of the first through seventeenth aspects further comprises an additional lever extending along the lever, and a gap between an outline of a control surface provided on the lever and an outline of an additional control surface provided on the additional lever is less or equal to 5 mm.

With the bicycle control device according to the eighteenth aspect, it is possible to provide a third control to the bicycle control device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF EMBODIMENTS

Figure 1:
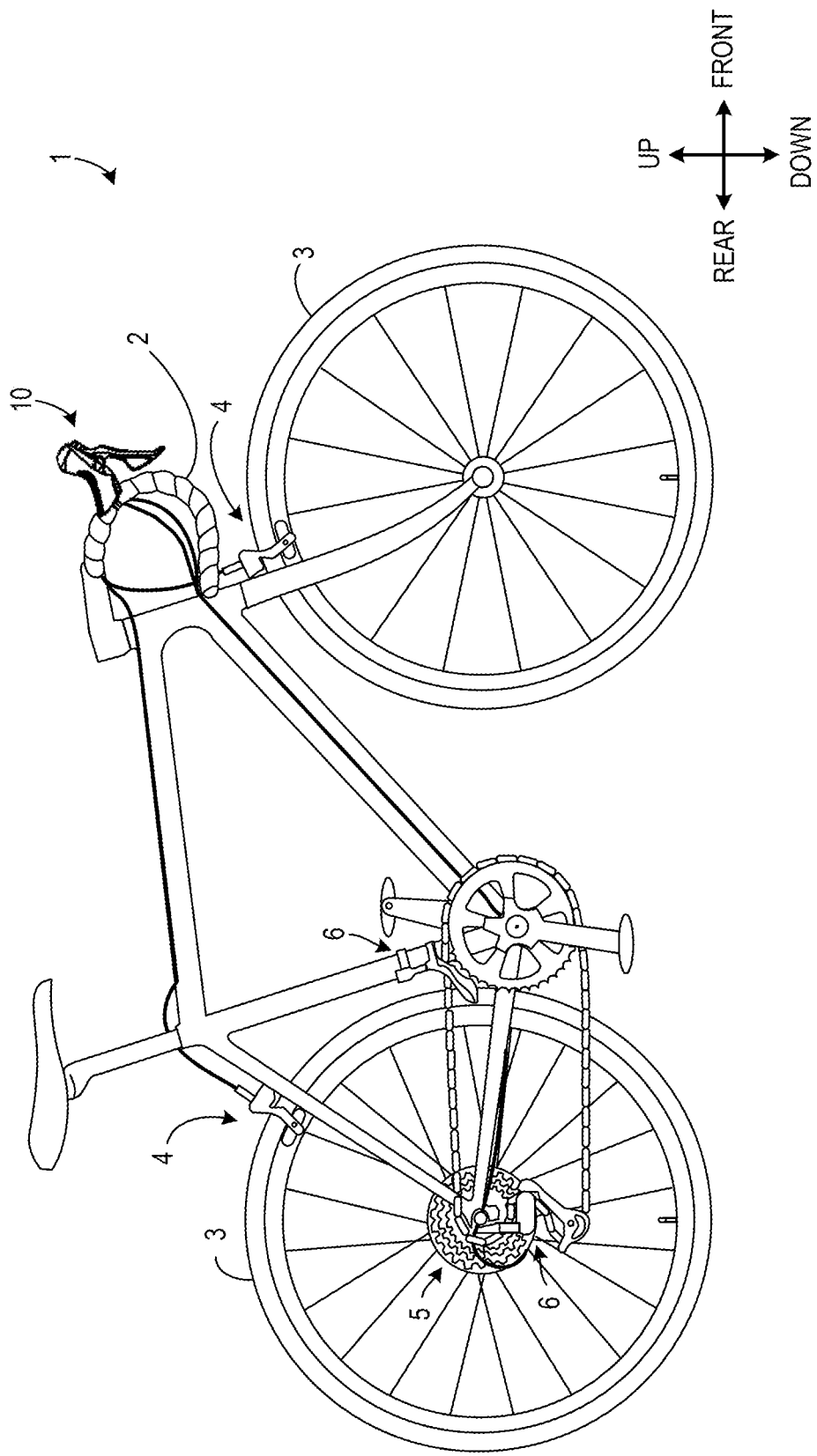
FIG. 1 is a side view of a bicycle having a bicycle control device in accordance with a first embodiment.

Selected embodiments will now be explained with reference to the drawings, wherein like reference numerals designate corresponding or identical elements throughout the various drawings. It will be apparent to those skilled in the art from this disclosure that the following descriptions of the embodiments are provided for illustration only and not for the purpose of limiting the invention as defined by the appended claims and their equivalents.

First Embodiment

Figure 8:
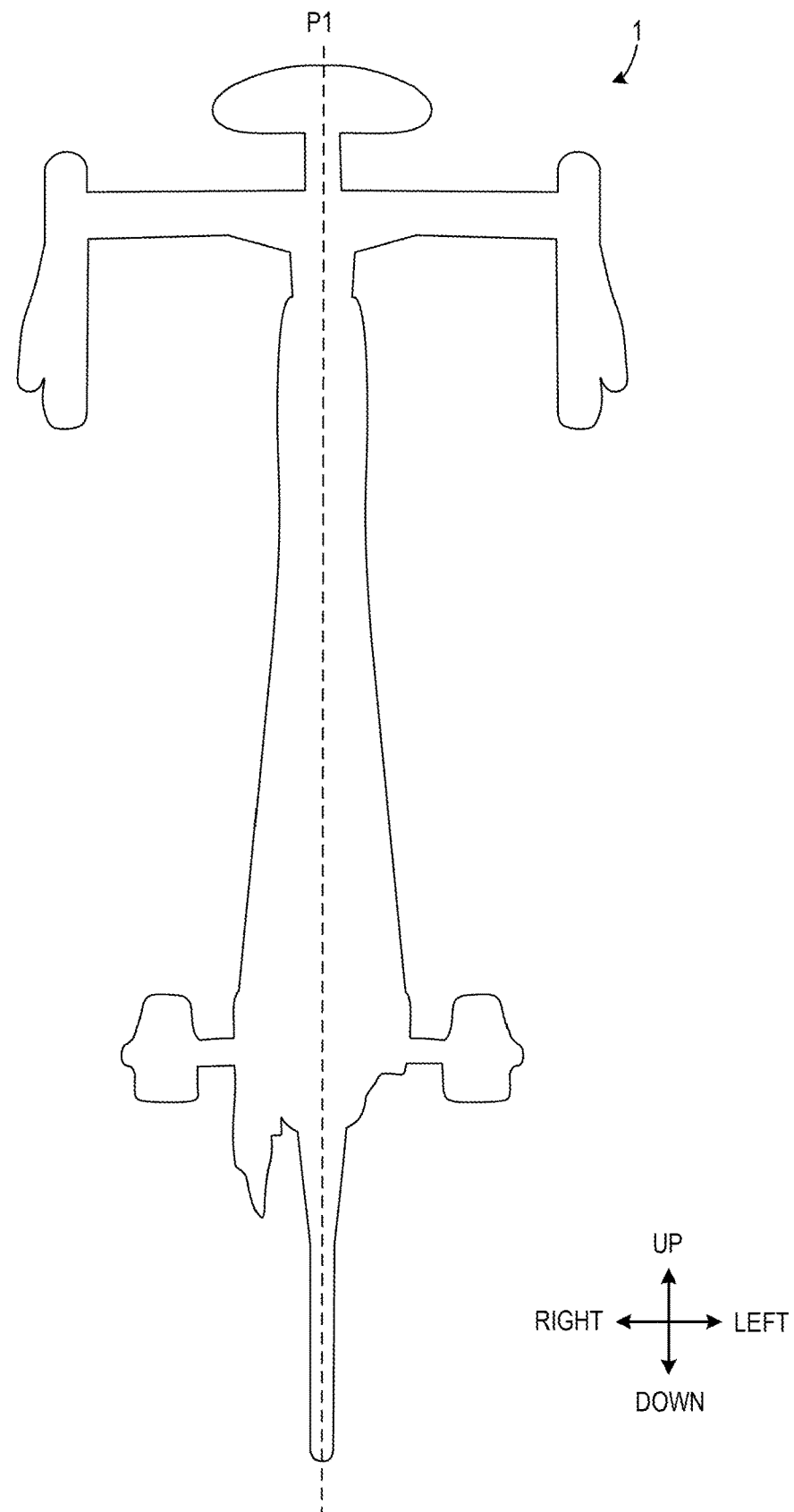
FIG. 8 is a schematic outline of the bicycle.

Referring initially to FIG. 1, a bicycle 1 having a pair of bicycle control devices 10 in accordance with a first embodiment is illustrated. The bicycle control device 10 arranged at a left side in the pair of bicycle control devices 10 is not shown in FIG. 1. The bicycle 1 may be, for example, a road type bicycle. Alternatively, the bicycle 1 may be an off-road bicycle such as a cyclocross bicycle or mountain bike. The bicycle 1 includes a handlebar 2, front and rear wheels 3, one or more brake devices 4, a sprocket assembly 5, one or more derailleurs 6, and a chain 7. As shown in the schematic outline of FIG. 8, the bicycle 1 may have a bicycle center plane P3 defining left and right halves of the bicycle 1. The following directional terms "front," "rear," "forward," "rearward," "left," "right," "transverse," "upward," and "downward," as well as any other similar directional terms, refer to those directions which are determined on the basis of a rider sitting upright on a saddle of the bicycle 1 while facing the handlebar 2, for example.

The handlebar 2 may be a drop type handlebar. Alternatively, the handlebar 2 may be a bullhorn type, flat type, or other type of handlebar. The pair of bicycle control devices 10 may be mounted on the handlebar 2 to receive user input from a rider riding the bicycle 1. The brake device(s) 4 may impart a braking force on one or both of the front and rear wheels 3 in response to the user input. The sprocket assembly 5 may be a rear sprocket assembly, as depicted in FIG. 1, or may be a front sprocket assembly. The derailleur(s) 6 may suitably include a front and/or rear derailleur. The derailleur(s) 6 may be configured to enact a gear shift of the sprocket assembly 5 in response to the user input by shifting the chain 7 in a transverse direction of the bicycle 1.

Figure 2:
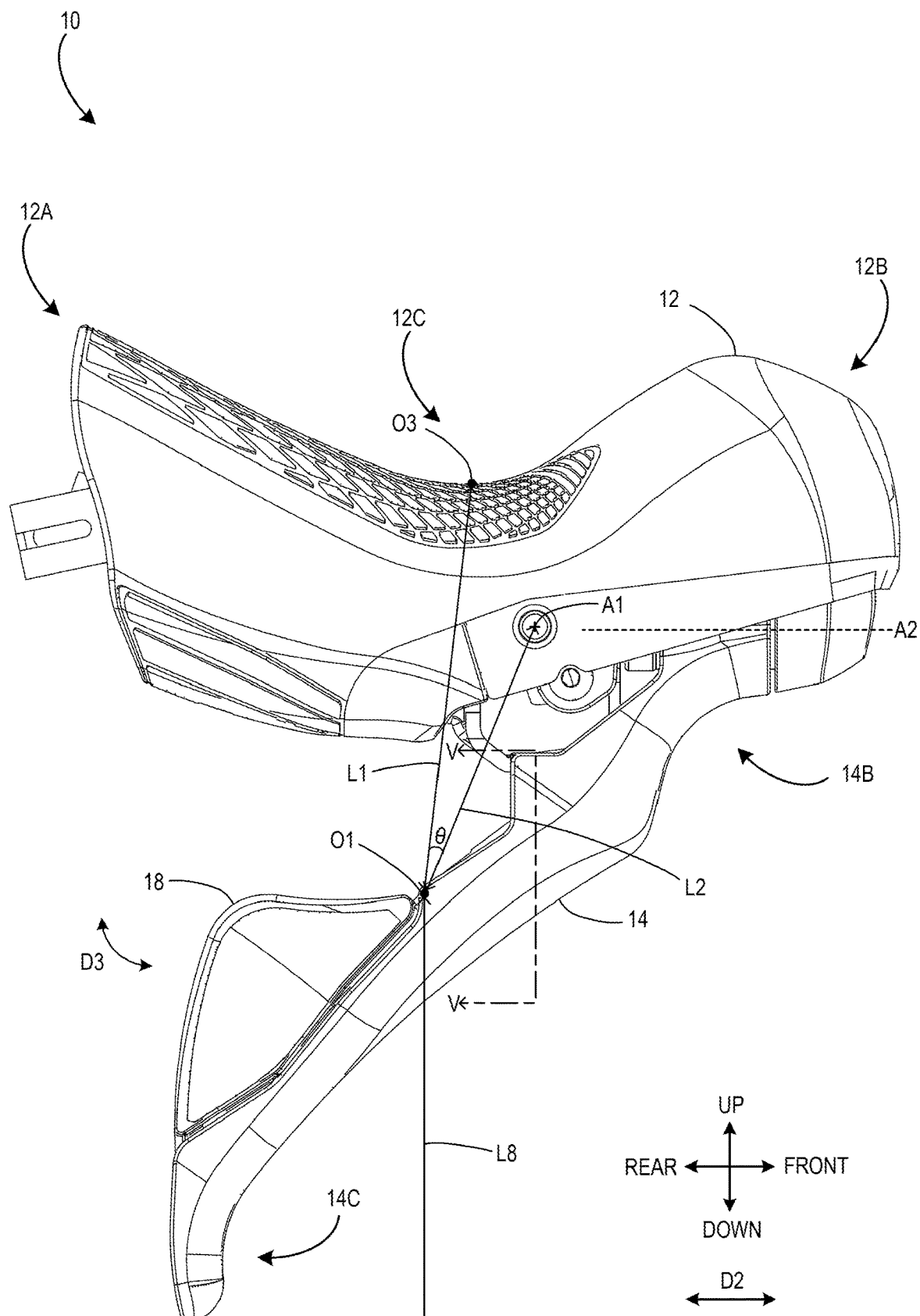
FIG. 2 is a side view of the bicycle control device.
Figure 3:
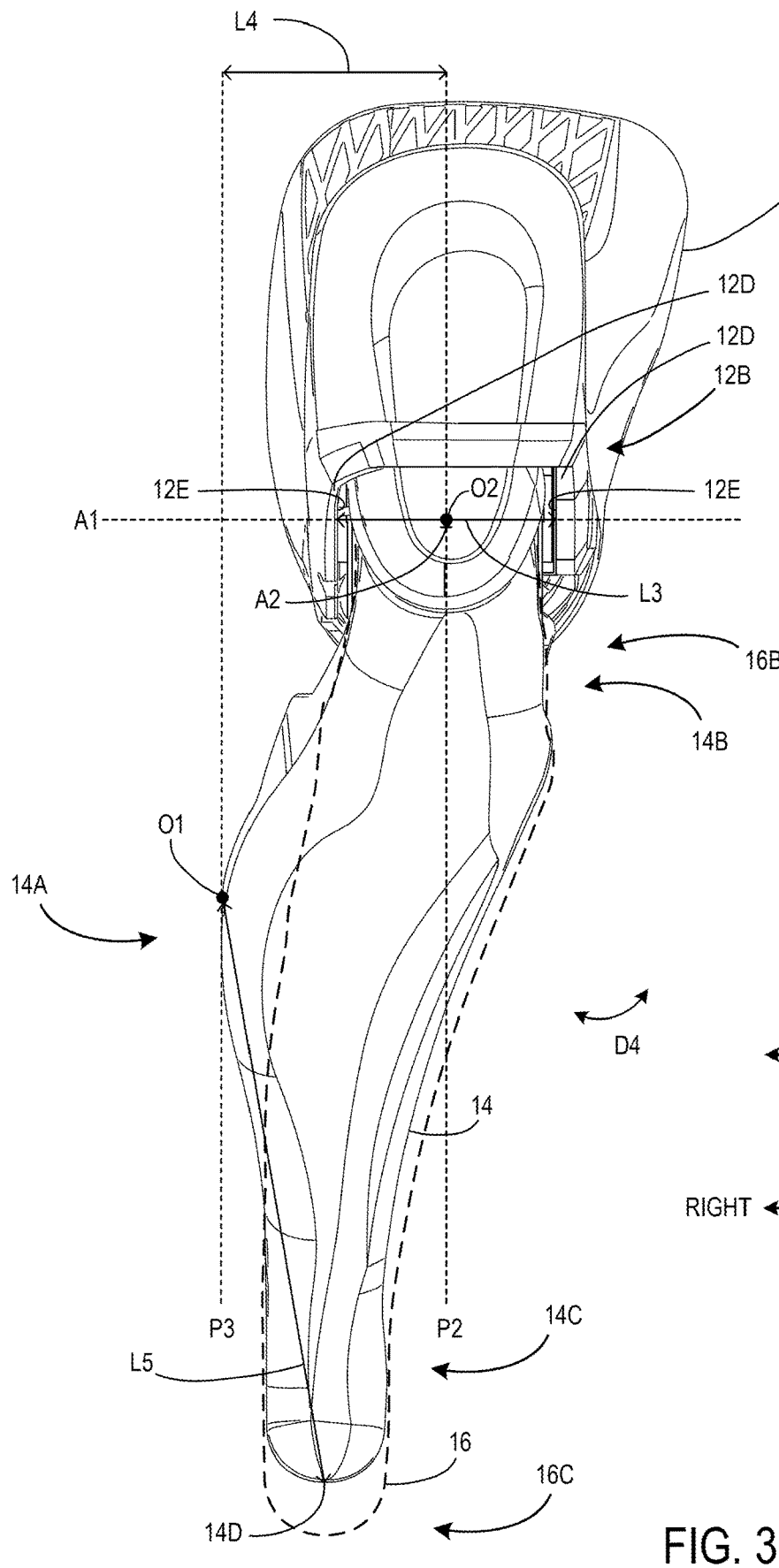
FIG. 3 is a front view of the bicycle control device.

FIG. 2 is a side view of the bicycle control device 10, and FIG. 3 is a front view of the bicycle control device 10. While the below description details a single control device 10, it will be appreciated that the bicycle control device 10 may be one of a pair. The other of the pair may be a substantial mirror image of the bicycle control device 10. For example, the bicycle control device 10 depicted below may be a right control device for use by the rider's right hand, and the other control device may be a left control device. When a pair is utilized, one control device 10 may enact one or more rear controls while the other control device may enact one or more front controls, for example. It will be appreciated that the bicycle control device 10 is illustrated in the drawings in a relaxed, neutral position.

The bicycle control device 10 comprises a bracket member 12 and a lever 14. The bracket member 12 includes a first end portion 12A and a second end portion 12B with a saddle portion 12C provided in between the first end portion 12A and the second end portion 12B for gripping. The bracket member 12 may include a main body 13A (FIG. 4) made of, for example, a resin and a cover 13B (FIG. 4) made of, for example, an elastomer. Alternatively, the bracket member 12 may be formed integrally without a separate cover. The rider may operate the bicycle control device 10 by, for example, placing a palm of the rider's hand on the saddle portion 12C and placing their fingers outwardly around a side of the bicycle control device 10 to rest their fingertips on a side or front of the lever 14. Alternatively, the rider may sometimes grip downwardly extending portions of the handlebar 2 behind the lever 14 with their palm in order to reach the lever 14 with one or more fingers.

As shown in FIG. 3, the second end portion 12B has a pair of spaced apart walls 12D with opposed surfaces 12E. The lever 14 is pivotally provided around a pivot axis A1 extending between the opposed surfaces 12E. The lever 14 includes a protruding portion 14A extending in an axial direction D1 (FIG. 3) of the pivot axis A1 to an outermost point O1. The lever further includes a proximal end portion 14B and a distal end portion 14C. The proximal end portion 14B is at least partly arranged between the opposed surfaces 12E, and the distal end portion 14C is further from the opposed surfaces 12E than the proximal end portion 14B. The protruding portion 14A is arranged between the proximal end portion 14B and the distal end portion 14C.

A reference plane P2 is defined by the bicycle control device 10. The reference plane P2 is parallel to the bicycle center plane P3 and defined at a midpoint O2 between the opposed surfaces 12E. In other words, reference plane P2 is positioned in the middle of a width L3 of a space between the opposed surfaces 12E. In cases where the opposed surfaces do not have a consistent midpoint across their entire surfaces, the midpoint O2 may be set along the first axis A1, for example. The outermost point O1 is offset from the reference plane P2. Such an offset is illustrated in FIG. 3 as s distance L4. For example, the outermost point O1 is at least 23.2 mm offset from the reference plane P2, as viewed from a parallel direction D2 (FIG. 2) parallel to the reference plane P2. In addition, the outermost point O1 is at most 50 mm offset from the reference plane P2. Preferably, the distance L4 is in a range from 24 to 30 mm. Concretely, the distance L4 is approximately 26 mm in this embodiment. Furthermore, the distal end portion 14C has a distal end 14D opposite the proximal end portion 14B. A shortest distance L5 between the outermost point O1 and the distal end 14D is at least 50 mm, as viewed from the parallel direction D2. The parallel direction D2 is defined as a direction extending along an additional axis A2 (FIG. 2). Preferably, the distance L5 is in a range from 50 to 80 mm. Concretely, the distance L5 is approximately 70 mm in this embodiment. Further, a height L8 (FIG. 2) of the outermost point O1 with respect to the distal end 14D is at least 50 mm, as viewed from the axial direction D1. The height L8 may be a vertical distance measured when the bicycle control device 10 is in a mounted orientation. Alternatively expressed, the height L8 may be a distance in a direction perpendicular to both the pivot axis A1 and the additional axis A2. Preferably, the height L8 is in a range from 50 to 80 mm. Concretely, the distance L8 is approximately 69 mm in this embodiment.

FIG. 2 may be considered a view from the axial direction D1 (FIG. 3), in a parallel plane P3 parallel to the reference plane P2 and containing the outermost point O1. As viewed in this manner, a shortest distance of a first line L1 connecting a saddle point O3 of the saddle portion 12C to the outermost point O1 on the lever 14, is in a range from 50 to 80 mm. Preferably, the first line L1 is in a range from 60 to 70 mm. Concretely, the first line L1 is approximately 67.5 mm in this embodiment. The saddle point O3 may be the point at which the palm of the rider's hand typically contacts the bracket member 12, and may further be the lowest point in a downward dip in the shape of the top of the saddle portion 12C. Also as viewed from the axial direction D1, in the parallel plane P3, an angle θ of the first line L1 is between 10 and 30 degrees from a second line L2 connecting the outermost point O1 to the pivot axis A1. Preferably, the angle θ is between 15 and 20 degrees. Concretely, the angle θ is approximately 17.5 degrees in this embodiment.

As shown in dashed lines in FIG. 3, the bicycle control device 10 may further comprise an interchangeable lever 16, interchangeably attachable to the bracket member 12 with the lever 14. As can be seen, respective proximal end portions 14B, 16B of the lever 14 and the interchangeable lever 16 have the same shape. Similarly, respective distal end portions 14C, 16C of the lever 14 and the interchangeable lever 16 have the same shape. However, the interchangeable lever 16 may be a conventional lever lacking the protruding portion 14A of the lever 14 and extending further to accommodate larger hands. Accordingly, the same shape of the distal end portions 14B, 16B may be formed at different distances from the pivot axis A1, as shown in FIG. 3. The lever 14 may be manufactured of one of a metal, composite, and plastic material. Similarly, the interchangeable lever 16 may be manufactured of one of a metal, composite, and plastic material.

The lever 14 is configured to pivot around the pivot axis A1 to actuate a first control, for example, along a first pivotal direction D3 (FIG. 2). One movement along the first pivotal direction D3 (e.g., rearward) actuates the first control while a reverse movement (e.g., forward) releases the first control. In addition, the lever 14 may be configured to pivot around the additional axis A2 skew to the pivot axis A1 to actuate a second control, for example, along a second pivotal direction D4 (FIG. 3). One movement along the second pivotal direction D4 (e.g., toward the bicycle center plane P3) actuates the second control while a reverse movement (e.g., away from the bicycle center plane P3) simply resets the lever 14 to an initial or last position. For both axes A1, A2, the lever 14 is automatically returned to the last position by biasing members, for example torsion springs, after the rider actuates the respective control and then alleviates force on the lever 14. In one example, the first control may be a brake and the second control may be a gear shift. For instance, the second control may shift the chain from a current sprocket to one of other sprockets on the rear sprocket assembly 5.

Figure 4:
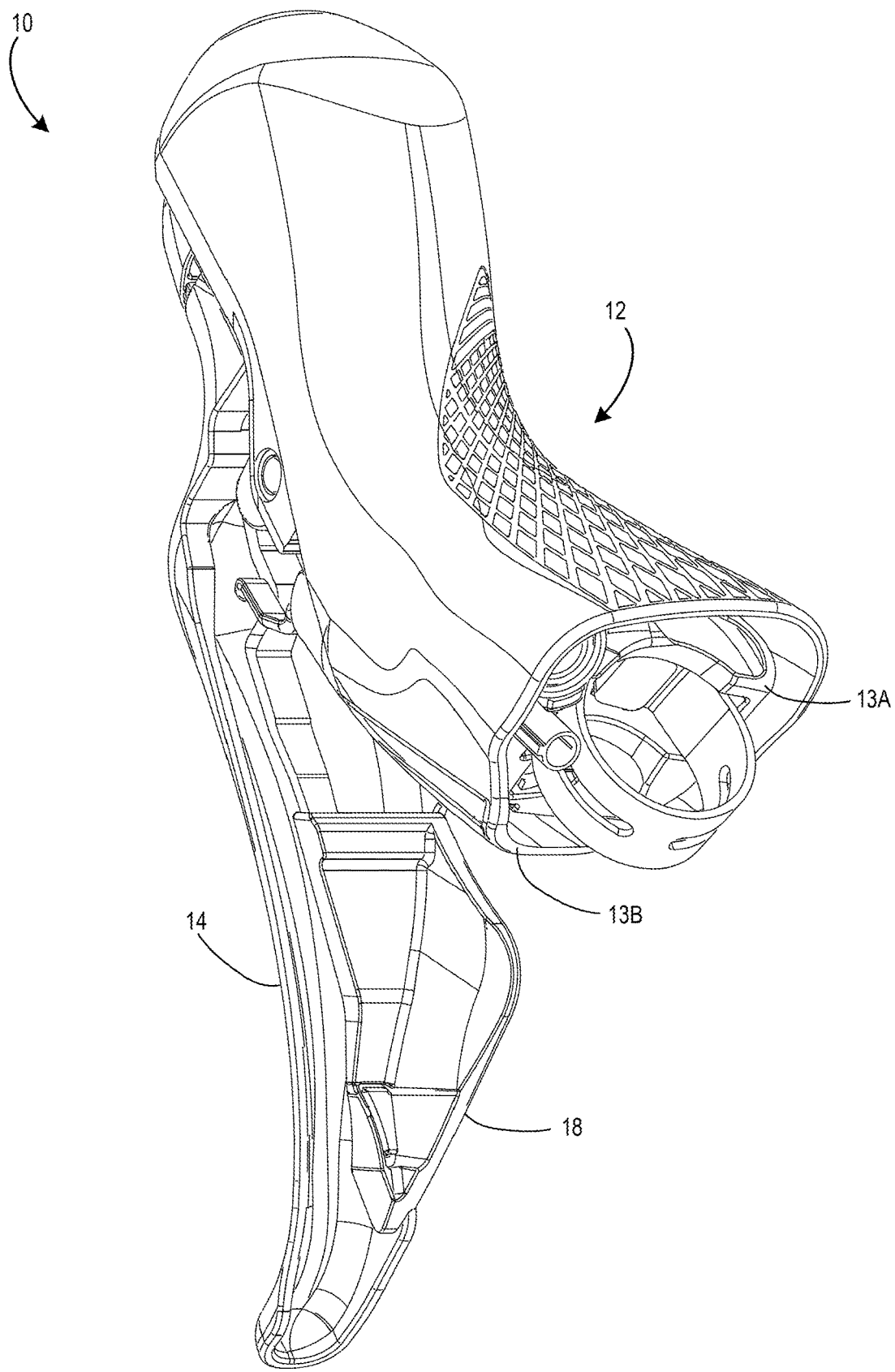
FIG. 4 is a rear perspective view of the bicycle control device.
Figure 5:
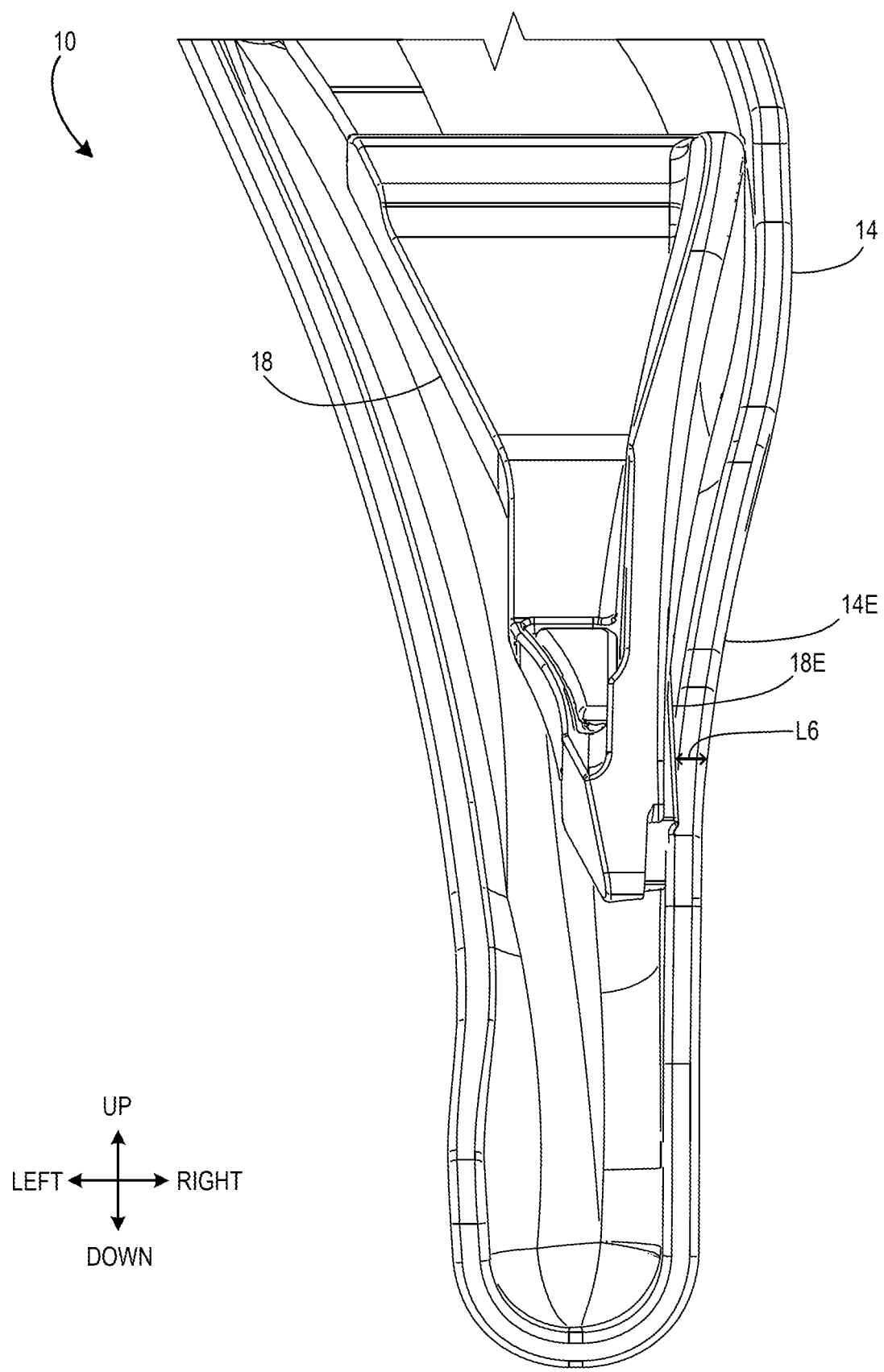
FIG. 5 is a partial rear view of the bicycle control device.

As shown in FIGS. 2, 4, and 5, the bicycle control device 10 may further comprise an additional lever 18 extending along the lever 14. The additional lever 18 may be configured to pivot together with the lever 14 when actuating the first control or the second control. Pivoting just the additional lever 18 along the second pivotal direction D4 without moving the lever 14 may actuate a third control, for example, shifting the chain from a current sprocket to one of other sprockets on the rear sprocket assembly 5 in an opposite direction with respect to the second control. The partial rear view of FIG. 5 illustrates a gap L6 between an outline of a control surface 14E provided on the lever 14 and an outline of an additional control surface 18E provided on the additional lever 18. The gap L6 is less than or equal to 5 mm. Preferably, the gap L6 is less than or equal to 3.5 mm. Concretely, the gap L6 is approximately between 2 and 3 mm in this embodiment. Keeping the gap L6 approximately constant along the length of the additional lever 18 may make it even easier for the rider to avoid accidentally pushing both levers 14, 18 simultaneously.

Figure 6:
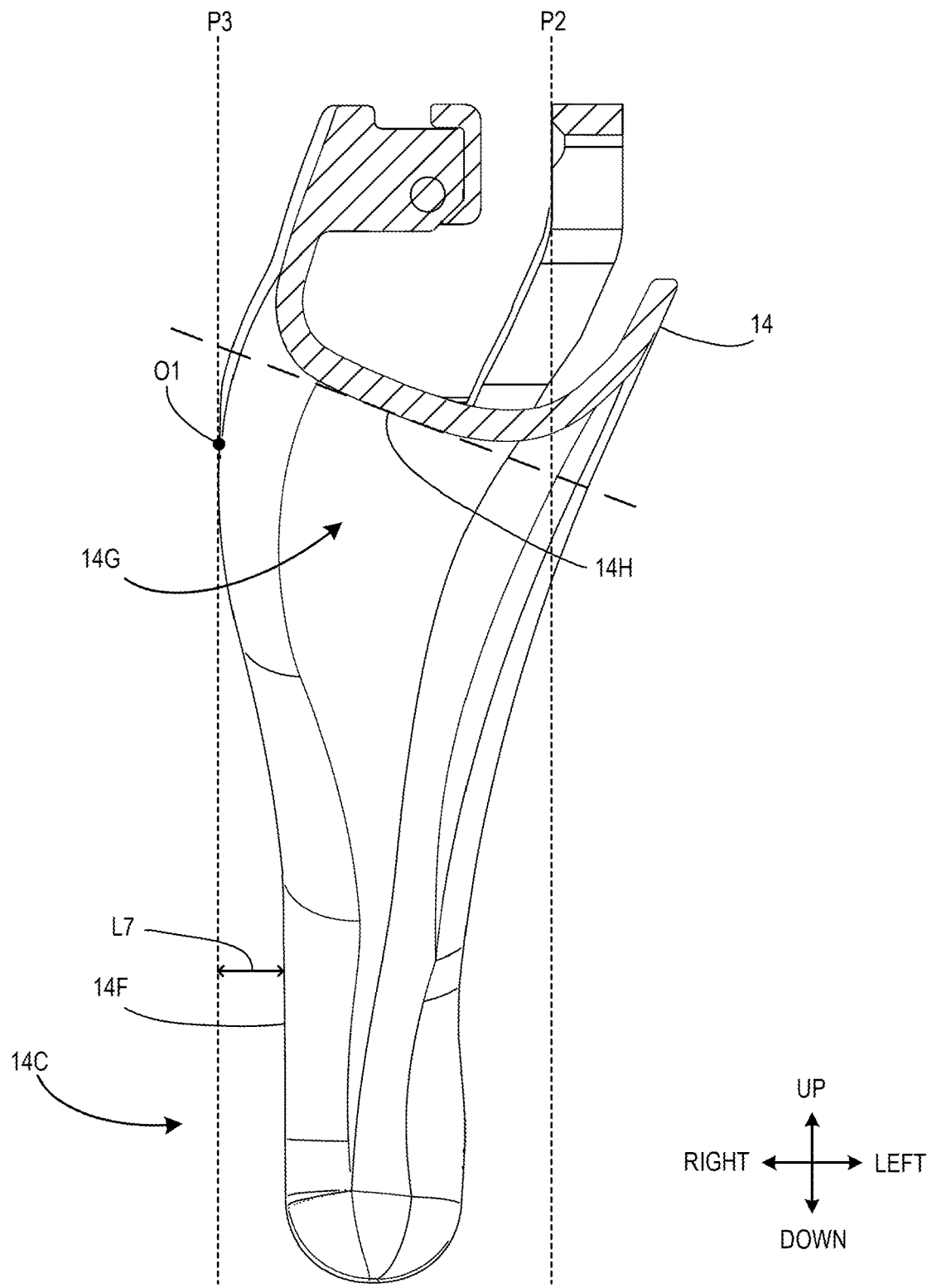
FIG. 6 is a partial cross-sectional view of the bicycle control device taken along a line V-V of FIG. 2.

Turning now to FIG. 6, a partial cross-sectional view of the bicycle control device 10 taken along a line V-V of FIG. 2 is shown. As can be seen, an offset part 14F may be formed in the distal end portion 14C so as to be offset from the protruding portion 14A toward the reference plane P2. Such an offset is illustrated by a distance L7. The distance L7 is in a range from 4 to 8 mm. Preferably, the distance L7 is in a range from 5 to 7 mm. Concretely, the distance L7 is approximately 6 mm in this embodiment. The lever 14 may include a finger-engaging surface 14G, at least a portion of which is a planar portion 14H. A dashed line has been added to illustrate the flatness of the planar portion 14H. The planar portion 14H of the finger-engaging surface 14G may be positioned entirely to one side of the reference plane P2.

Second Embodiment

Figure 7:
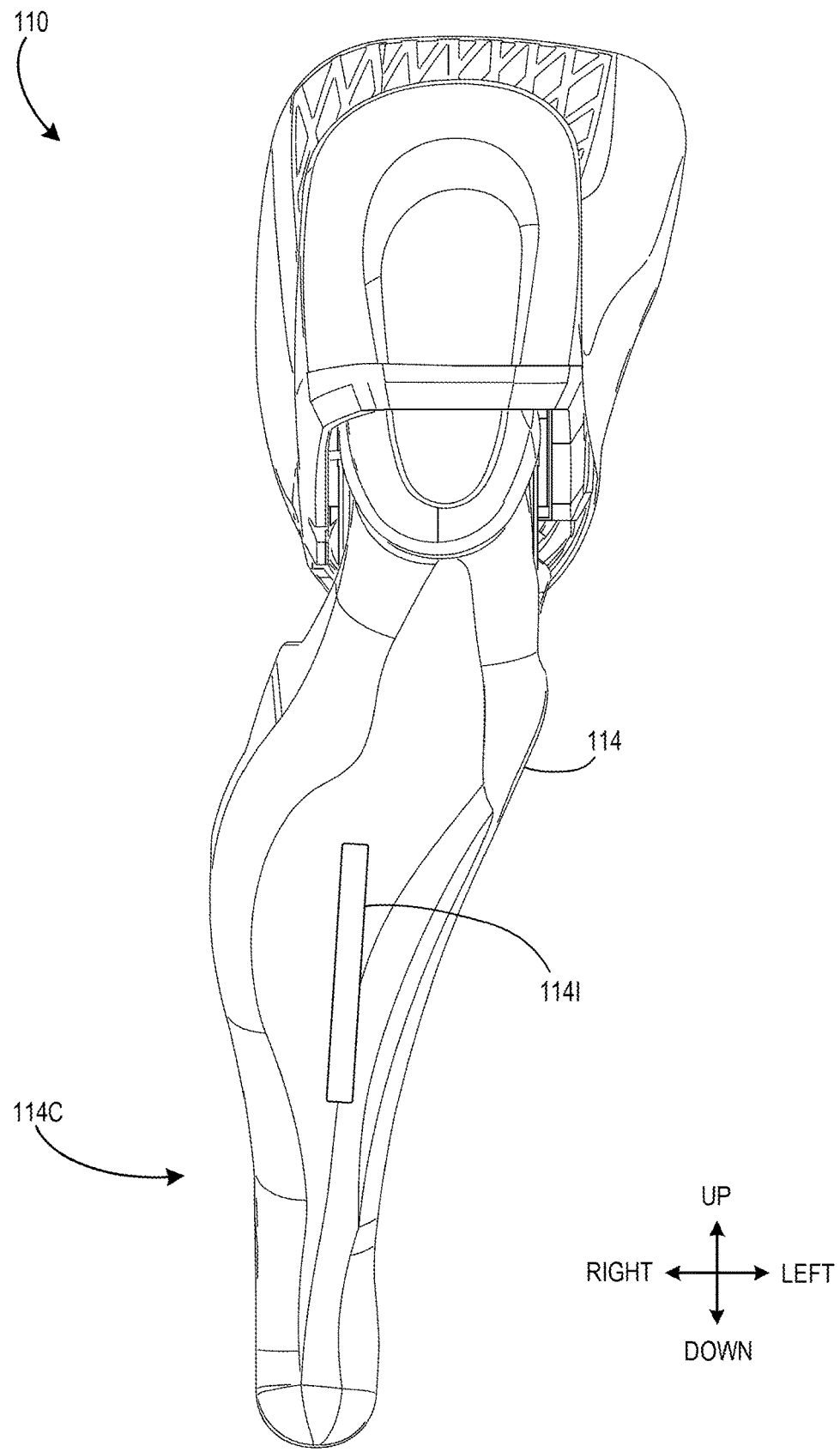
FIG. 7 is a front view of a control device in accordance with a second embodiment.

FIG. 7 is a front view of a bicycle control device 110 in accordance with a second embodiment. The bicycle control device 110 is the same as the bicycle control device 10 except that the lever 114 of the bicycle control device 110 includes a recess 1141. The recess 1141 may extend along the length of the lever 114. The recess 1141 may be at least partly provided on the distal end portion 114C of the lever 114. The recess 1141 may be formed as an indentation, or may be formed as a through hole. The recess 1141 is an optional feature that may be combined with other features of the first embodiment, or may be omitted.

While only selected embodiments have been chosen to illustrate the present invention, it will be apparent to those skilled in the art from this disclosure that various changes and modifications can be made herein without departing from the scope of the invention as defined in the appended claims. For example, the size, shape, location, or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A bicycle control device, comprising:
   a bracket member including a first end portion and a second end portion with a saddle portion provided in between the first end portion and the second end portion for gripping, the second end portion having a pair of spaced apart walls with opposed surfaces;
   a lever pivotally provided around a pivot axis extending between the opposed surfaces, the lever including a proximal end portion at least partly arranged between the opposed surfaces, a distal end portion further from the opposed surfaces than the proximal end portion, and a protruding portion extending in an axial direction of the pivot axis to an outermost point of the protruding portion, the protruding portion arranged between the proximal end portion and the distal end portion; and
   an additional lever having an actuation surface that faces in the axial direction of the pivot axis and extends along at least a portion of the lever,
   wherein an entirety of the actuation surface that extends along the portion of the lever is located at a distance from a distal end of the lever that is smaller than a distance of the outermost point of the protruding portion from the distal end of the lever, the distal end being opposite to the pivot axis of the lever.

2. The bicycle control device of claim 1, wherein a shortest distance between the outermost point and the distal end is at least 50 mm, as viewed from a parallel direction parallel to a reference plane parallel to a bicycle center plane and defined at a midpoint between the opposed surfaces.

3. A bicycle control device, comprising:
   a bracket member including a first end portion and a second end portion with a saddle portion provided in between the first end portion and the second end portion for gripping, the second end portion having a pair of spaced apart walls with opposed surfaces;
   a lever pivotally provided around a pivot axis extending between the opposed surfaces, the lever including a protruding portion extending in an axial direction of the pivot axis to an outermost point of the protruding portion that is offset from a reference plane parallel to a bicycle center plane and defined at a midpoint between the opposed surfaces, wherein as viewed from the axial direction, in a parallel plane parallel to the reference plane and containing the outermost point, a shortest distance of a first line connecting a saddle point of the saddle portion to the outermost point on the lever, is in a range from 50 to 80 mm; and an additional lever having an actuation surface that faces in the axial direction of the pivot axis and extends along at least a portion of the lever, wherein an entirety of the actuation surface that extends along the portion of the lever is located at a distance from a distal end of the lever that is smaller than a distance of the outermost point of the protruding portion from the distal end of the lever, the distal end being opposite to the pivot axis of the lever.

4. A bicycle control device, comprising:

a bracket member including a first end portion and a second end portion with a saddle portion provided in between the first end portion and the second end portion for gripping, the second end portion having a pair of spaced apart walls with opposed surfaces;

a lever pivotally provided around a pivot axis extending between the opposed surfaces, the lever including a protruding portion extending in an axial direction of the pivot axis to an outermost point of the protruding portion that is at least 23.2 mm offset from a reference plane parallel to a bicycle center plane and defined at a midpoint between the opposed surfaces, as viewed from a parallel direction parallel to the reference plane; and an additional lever having an actuation surface that faces in the axial direction of the pivot axis and extends along at least a portion of the lever, wherein an entirety of the actuation surface that extends along the portion of the lever is located at a distance from a distal end of the lever that is smaller than a distance of the outermost point of the protruding portion from the distal end of the lever, the distal end being opposite to the pivot axis of the lever.

5. The bicycle control device of claim 4, wherein the outermost point is at most 50 mm offset from the reference plane.

6. The bicycle control device of claim 4, wherein, as viewed from the axial direction, in a plane parallel to the reference plane and containing the outermost point, a shortest distance of a first line connecting a saddle point of the saddle portion to the outermost point on the lever, is in a range from 50 to 80 mm.

7. The bicycle control device of claim 6, wherein as viewed from the axial direction, in the plane, an angle of the first line is between 10 and 30 degrees from a second line connecting the outermost point to the pivot axis.

8. The bicycle control device of claim 4, wherein the lever includes a proximal end portion and a distal end portion, and an offset part formed in the distal end portion so as to be offset from the protruding portion toward the reference plane.

9. The bicycle control device of claim 4, wherein the lever includes a recess.

10. The bicycle control device of claim 4, wherein the lever is manufactured of one of a metal, composite, and plastic material.

11. The bicycle control device of claim 4, further comprising an interchangeable lever, interchangeably attachable to the bracket member with the lever.

12. The bicycle control device of claim 11, wherein respective proximal end portions of the lever and the interchangeable lever have the same shape.

13. The bicycle control device of claim 11, wherein respective distal end portions of the lever and the interchangeable lever have the same shape.

14. The bicycle control device of claim 4, wherein the lever includes a finger-engaging surface, at least a portion of which is a planar portion.

15. The bicycle control device of claim 14, wherein the planar portion of the finger-engaging surface is positioned entirely to one side of the reference plane.

16. The bicycle control device of claim 4, wherein the lever is configured to pivot around the pivot axis to actuate a first control, and the lever is configured to pivot around an additional axis skew to the pivot axis to actuate a second control.

17. The bicycle control device of claim 16, wherein the first control is a brake and the second control is a gear shift.

18. The bicycle control device of claim 4, wherein a gap between an outline of a control surface provided on the lever and an outline of an additional control surface provided on the additional lever is less than or equal to 5 mm.

19. The bicycle control device of claim 4, wherein the additional lever is at least partially arranged below the outermost point as viewed from the parallel direction.

* * * * *